(12) United States Patent
Citti et al.

(10) Patent No.: US 7,685,843 B2
(45) Date of Patent: Mar. 30, 2010

(54) TIN OXIDE MATERIAL WITH IMPROVED ELECTRICAL PROPERTIES FOR GLASS MELTING

(75) Inventors: Olivier Citti, Wellesley, MA (US); James A. A. Williams, Buckhannon, WV (US); Charles N. McGarry, Buckhannon, WV (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 696 days.

(21) Appl. No.: 10/898,146

(22) Filed: Jul. 23, 2004

(65) Prior Publication Data
US 2006/0016223 A1    Jan. 26, 2006

(51) Int. Cl.
*C03B 11/08* (2006.01)
(52) U.S. Cl. .................. 65/374.13; 373/36; 373/133
(58) Field of Classification Search ............... 65/374.13; 373/36, 133
See application file for complete search history.

(56) References Cited

U.S. PATENT DOCUMENTS

| 2,244,777 | A | 6/1941 | Hood et al. |
| 2,256,033 | A | 9/1941 | McLachlan, Jr. |
| 2,467,144 | A | 4/1949 | Mochel |
| 2,490,825 | A | 12/1949 | Mochel |
| 3,287,284 | A | 11/1966 | Norman |
| 3,502,597 | A | 3/1970 | Bush |
| 3,813,468 | A | 5/1974 | Shaw |
| 4,110,545 | A | 8/1978 | Shaw et al. |
| 4,512,023 | A | 4/1985 | Brinkman |

FOREIGN PATENT DOCUMENTS

| CN | 85 1 00034 A |   | 8/1986 |
| CN | 85100034 A | * | 8/1986 |
| SU | 683 681 A |   | 5/1978 |
| SU | 833 830 A |   | 5/1981 |

* cited by examiner

*Primary Examiner*—Mark Halpern
(74) *Attorney, Agent, or Firm*—Larson Newman & Abel, LLP; Robert T. Conway

(57) ABSTRACT

A tin oxide-based electrode formed from a composition comprising a major component $SnO_2$ is disclosed. The composition includes additives including $aCuO$, $bZnO$, and $cSb_2O_3$, wherein a, b, and c represent weight percentages of respective components, and $0.2 \leq (a+b)/c < 1.0$.

25 Claims, 2 Drawing Sheets

TIN OXIDE MATERIAL WITH IMPROVED ELECTRICAL PROPERTIES FOR GLASS MELTING

CROSS-REFERENCE TO RELATED APPLICATION(S)

Background

1. Field of the Disclosure

The present invention is generally directed to tin oxide-based electrodes, and particularly, electrodes for use in glass melting applications.

2. Description of the Related Art

Commercial glass melting operations typically rely upon use of fossil fuels such as natural gas or oil. The use of electric energy is also possible either as an additional source of energy, as the main source of energy, or the sole source of energy as in an electric furnace. In the latter case, electric furnaces make use of refractory electrodes whose very high electrical conductivity allows direct heating of the glass by passing the current between electrodes directly through the glass. Such electrodes have been fairly well studied in the art. However, with the development of new technologies and increasing demand for high performance glass components, such as for utilization in flat displays including LCD and plasma displays, increasing demands have been placed upon the mechanical and optical performance of glasses, and in turn the performance of glass melting equipment.

In the context of electric furnacing operations, use has been made of various tin oxide-based electrode compositions, such as those detailed in U.S. Pat. No. 3,287,284 (commonly owned by the present assignee). While the technology described in U.S. Pat. No. 3,287,284 is decades old, development of new tin oxide electrode materials has been incremental, common of mature art areas, and U.S. Pat. No. 3,287,284 represents important state-of-the-art materials. As described, the tin oxide-based compositions include various components that assist in densification or resistivity, for example. Among the various additives described, U.S. Pat. No. 3,287,284 utilizes a combination of copper oxide, zinc oxide, and antimony oxide. The components are on the one hand described in fairly broad compositional ranges, namely 0.1 to 0.5% copper oxide, 0.5 to 1.0% zinc oxide, and 0.7 to 1.2% antimony oxide, but on the other, actually only reduced to practice within fairly narrow ranges.

While certain working embodiments described in U.S. Pat. No. 3,287,284 have desirable properties, a need continues to exist in the art for improved tin oxide-based electrodes, such as those having more stable electrical properties, such as stable electrical resistivity as a function of heat cycling, and better low temperature resistivity. For example, U.S. '284 shows a range or 0.15 to 2.5 ohm-cm at 100° C. Other characteristics include improvement in corrosion properties, reduction in porosity, notably open porosity, as well as desirable low-temperature resistivity, and other properties.

SUMMARY

According to one aspect of the present invention, a tin oxide-based electrode is formed from a composition including a major component comprised of $SnO_2$, and additives including CuO, ZnO, and $Sb_2O_3$, in amounts of a, b, and c, respectively. According to a particular feature, $0.2 \leq (a+b)/c < 1.0$.

According to another aspect of the present invention, a glass melt apparatus is provided having a furnace including a plurality of tin oxide-based electrodes exposed into an interior of the furnace. Each of the electrodes is formed from a composition including a major component comprised of $SnO_2$, and additives including CuO, ZnO, and $Sb_2O_3$, in amounts of a, b, and c, respectively. According to a particular feature, $0.2 \leq (a+b)/c < 1.0$.

DESCRIPTION OF THE PREFERRED EMBODIMENT(S)

Figure 1:
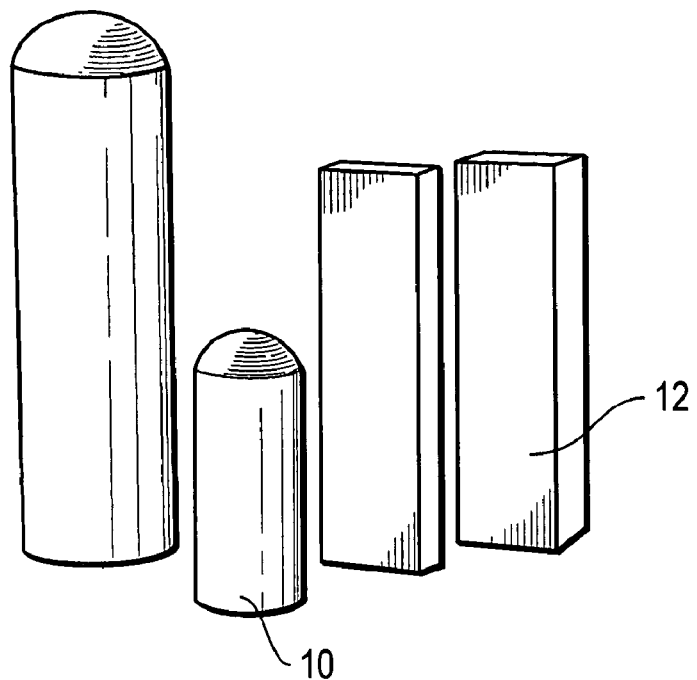
FIG. 1 illustrates various tin oxide-based electrodes according to embodiments of the present invention.

According to one aspect of the present invention, a tin oxide-based electrode is formed by sintering a composition including $SnO_2$ as the major component with particular oxides for modifying the properties of the electrode. Such oxides, include CuO, ZnO, $Sb_2O_3$, in respective amounts of a, b, and c. The term "major component" means that more than 50 wt % of the composition from which the electrode according to the present invention is formed is represented by $SnO_2$.

According to one feature, the relative content of each of the additives is controlled to be within various ranges. For example, CuO may be present in an amount not less than about 0.025 wt %. Other embodiments have even greater amounts of CuO, such as not less than about 0.035 wt %, or not less than about 0.045 wt %. Upper limits of the CuO may be on the order of 0.15 wt %, such as not greater than about 0.10 wt %. A particular content of CuO utilized in working embodiments was about 0.05 wt %.

Turning to the zinc oxide component, certain embodiments call for a range of about 0.25 to 0.975 wt %, such as within a range of about 0.40 to 0.60 wt %. Certain embodiments discussed below have an amount of ZnO of about 0.50 wt %.

Turning to the antimony oxide component, $Sb_2O_3$ may be present within a range of about 0.50 to about 1.5 wt %, such as within a range of about 0.75 to 1.25 wt %. Certain embodiments had an $Sb_2O_3$ content of about 1.0 wt %.

Tin oxide is generally the main component, forming not less than about 95 wt % of the composition, more typically not less than about 98 wt % of the composition. As to the particular form of the tin oxide, certain embodiments have taken advantage of essentially entirely reactive (virgin) $SnO_2$ powder, while other embodiments have utilized $SnO_2$ in the form of grog or calcined powder. Oftentimes, this grog powder contains minor amounts of other oxides. These minor amounts of other oxides can represent up to 2 wt %, generally not greater than 1 wt % or not greater than 0.5 wt % of the composition from which the tin oxide based electrode according to embodiments of the present invention is formed. To the extent that other oxides are provided, particularly including CuO, ZnO, or $Sb_2O_3$, such oxides do not compose or count as part of the additive package described above, but rather, are considered part of the $SnO_2$ base of the electrode composition.

While the foregoing weight percent ranges relating to the various additives described above may be particularly useful in fabrication of working examples, one aspect of the present invention specifies particularly relevant compositional features, by relating the relative contents of the additives with respect to each other. According to a particular feature, not only are the individual contents of each of the additives provided within particular ranges, but also, the relationships between the components are defined to be within certain parameters. According to one embodiment, $0.2 \leq (a+b)/c < 1.0$. That is, the sum of CuO plus ZnO divided by the content of $Sb_2O_3$ is not less than 0.2, and less than 1.0. According to other embodiments, the foregoing ratio of $(a+b)/c$ is less than 0.9, such as less than 0.8 or 0.7. According to other embodiments, the value of $(a+b)/c$ is not less than 0.3.

In addition, the ratio of $a/b$ (CuO to ZnO) may also be confined to be within certain parameters. For example, $a/b$ may be greater than 0.05 and less than 0.7. Upper limits of the $a/b$ ratio may be lower, such as not greater than 0.6 or 0.5. Certain embodiments may have a lowered $a/b$ ratio, on an order of not greater than 0.20, such as not greater than 0.18.

Typically, formation of tin oxide-based electrodes according to embodiments of the present invention begin with mixing raw materials. The manufacturing of tin oxide electrodes is a difficult process since high densification requirements lead to high green to fired state shrinkages. However, to manufacture the described tin oxide electrodes, the following process was followed. Reactive and calcined powders are energetically blended with sintering additives and electronic dopants until a sufficient homogeneity of the mix is reached; then molds are filled, vacuumed and isostatically pressed at high pressures to compact the green bodies; once pressed, the green bodies are fired at a temperature of at least 1400° C. Fired blocks are finally machined down to requested dimensions.

Figure 2:
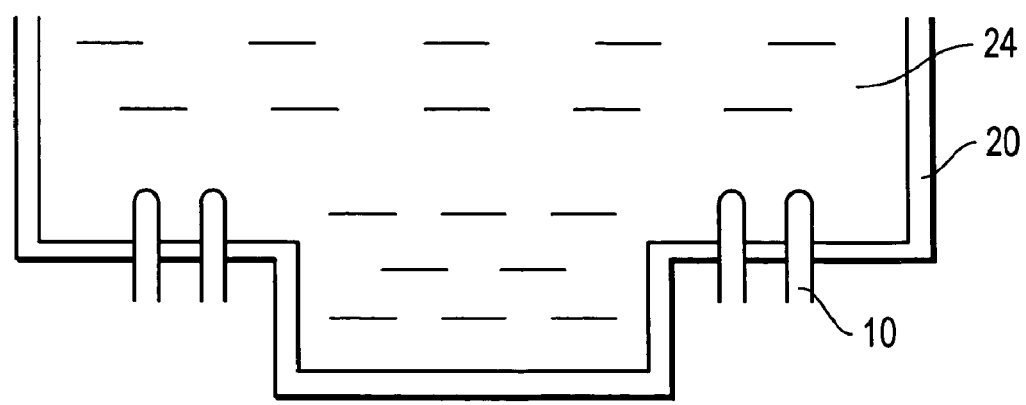
FIG. 2 illustrates the implementation of tin oxide-based electrodes in a glass-melting furnace.

The resulting formed tin oxide-based electrodes may take on various geometric contours including bullet-shaped cylindrical members 10, or generally rectangular or polygonal members 12, shown in FIG. 1. The actual implementation of the electrodes can be seen schematically in FIG. 2, illustrating electrodes 10 exposed to an interior 24 of furnace 20, in which a glass melt is provided.

The resulting tin oxide-based electrodes according to embodiments of the present invention were found to have various desirable properties. According to one feature, the electrode may have a tightly controlled open porosity, such as not greater than about 0.7 vol. %, such as on the order of 0.5 vol. % or even lower. Certain embodiments had an open porosity of not greater than about 0.4 vol. %, and indeed certain working examples were found to have an open porosity of 0.3 and 0.2 vol. %. The relative open porosity is particularly important to provide improved long-term durability, by attenuating the relative penetration of the glass melt into the electrode, to improve corrosion resistance. In a similar manner, bulk density of the electrode may be relatively high, such as not less than about 6.60 g/cm³, or not less than about 6.70 g/cm³.

Still further, tin oxide-based electrodes were found to have desirable electrical resistivity levels; in one embodiment, the electrical resistivity is not less than about 1 ohm-cm at 100° C., and may be even further restricted to have an electrical resistivity of not greater than about 0.5 Ω-cm at 100° C., not greater than 0.25 Ω-cm at 100° C., or even not greater than about 0.1 Ω-cm at 100° C. Noteworthy, the foregoing electrical resistivity properties are associated with the tin oxide-based electrode in the as-formed state, without the need or requirement for a post forming annealing process, which is particularly disadvantageous. That is, the prior art that takes advantage of or utilizes annealing to modify electrical resistivity typically suffers from a marked degradation of resistivity after exposure to one or more heating cycles. In contrast, embodiments of the present invention demonstrate superior long-term electrical properties, even through one or more heat cycles. The tin oxide-based electrode may maintain its resistivity having a maximum volume resistivity increase of $1 \times 10^{-1}$ Ω-cm at 400° C. after exposure to a heating cycle. Typically, the heating utilized for quantification of this resistivity change is carried out to an elevated temperature of at least 900° C., such as on the order of 1100° C. Other embodiments have a maximum increase in resistivity of $2 \times 10^{-2}$ Ω-cm, such as a maximum increase in resistivity of $1 \times 10^{-2}$ Ω-cm at 400° C., after exposure to a heating cycle.

According to embodiments of the present invention, the compositional features of the tin oxide-based electrode have been developed in a manner that not only focuses on the relative content of each single additive, but also focuses and considers the global, entire scope of the additive package and quantifies their interrelationships. In this regard, while the prior art oftentimes will specify fairly broad compositional features, the state-of-the-art has generally failed to appreciate the interrelationships between the various additives, and quantify compositional features to improve electrode performance, in terms of density, open porosity, low temperature electrical resistivity, maintenance of electrical resistivity through heat cycling, corrosion resistance, thermal impact resistance, and related parameters. A detailed analysis of the actual implementation of the broad compositional features described in the art reveals that the art has generally failed to appreciate the effects of the compositional relationships between additives, which are described herein.

According to a further aspect, the present invention refers to a glass melt apparatus including a furnace defining an interior in which a glass melt is provided, wherein one or more tin oxide-based electrode(s) extend(s) into and is/are exposed to the interior of the furnace, each electrode including a major component comprised of $SnO_2$, and additives comprising a=CuO, b=ZnO, and c=$Sb_2O_3$, wherein a, b, and c represent weight percentages of the respective components CuO, ZnO, and $Sb_2O_3$, and $0.2 \leq (a+b)/c < 1.0$. All the preferred embodiments and features discussed above in the context of the tin oxide-based electrode also apply to the glass melt apparatus of the present invention.

EXAMPLES

Turning to particular working examples, several different compositions were prepared and tested, utilizing the same basic process flow described above. A summary of the compositional and measured physical characteristics of examples Zn3, Zn7 and Zn8 are provided below in the Table.

TABLE

|  | Zn3 | Zn7 | Zn8 |
|---|---|---|---|
| $SnO_2$ (virgin) wt. % | 98.45 | 88.45 | 78.4 |
| $SnO_2$ (calcined) wt. % | — | 10 | 20 |
| ZnO wt. % | 0.5 | 0.5 | 0.72 |
| CuO wt. % | 0.05 | 0.05 | 0.08 |
| $Sb_2O_3$ wt. % | 1 | 1 | 0.8 |
| CuO/ZnO | 0.1 | 0.1 | 0.11 |
| (CuO + ZnO)/$Sb_2O_3$ | 0.55 | 0.55 | 1.00 |
| Bulk density g/cm³ | 6.74 | 6.71 | 6.60 |
| Open porosity (%) | 0.2 | 0.3 | 0.5 |
| Resistance, RT (Ω) | 0.1 | 0.1 | 0.1 |
| ER (Ω-cm) 100° C. | $6.6 \times 10^{-3}$ | $3.3 \times 10^{-3}$ | $1 \times 10^{-3}$ |
| ER (Ω-cm) 1100° C. | $2.4 \times 10^{-3}$ | $2.1 \times 10^{-3}$ | $2.9 \times 10^{-3}$ |
| ER (Ω-cm) 100° C. (after heat cycle (1100° C.)) | $3.5 \times 10^{-3}$ | $5.2 \times 10^{-3}$ | n/a |
| ERΔ (Ω-cm) 400° C. (after heat cycle) | $1 \times 10^{-3}$ | $<1 \times 10^{-3}$ | $1.4 \times 10^{-2}$ |
| Corrosion Index | 106 | 107 | 101 |

Figure 3:
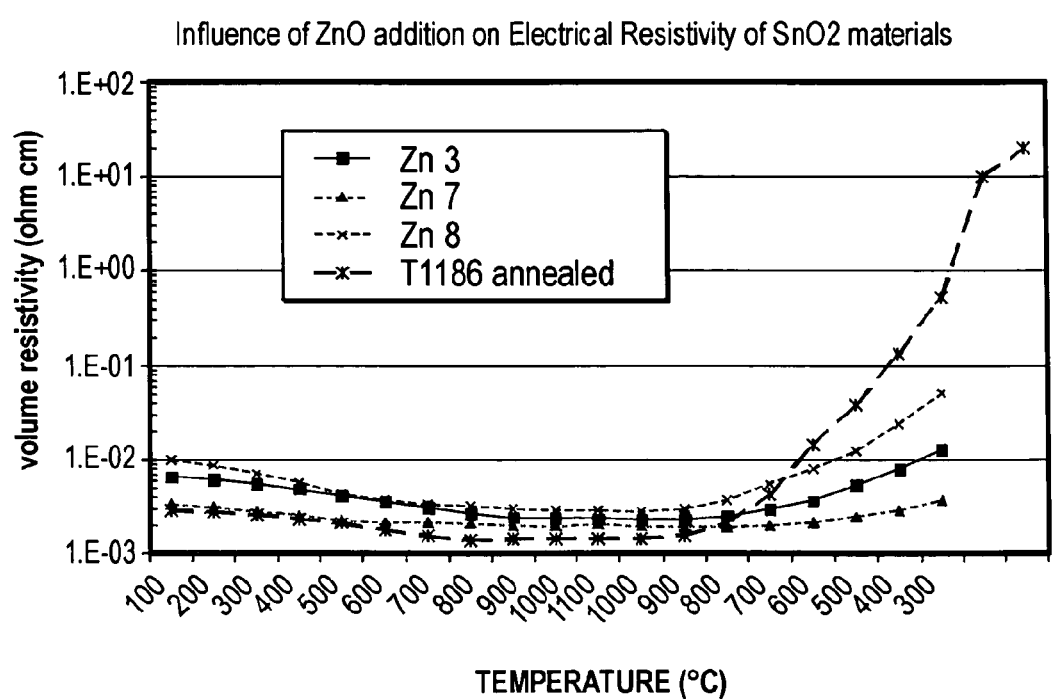
FIG. 3 represents measured volume resistivity of particular samples as a function of temperature, through a single heating cycle.

As should be fairly prominent from the reported data, sample Zn3 and particularly Zn7 have desirable properties. As reported, low room temperature resistance, finely controlled open porosity, and high density are coupled with desirable electrical features. For example, the samples were found to have a desirably low electrical resistivity at low temperatures (100° C.), as well as low electrical resistivity at high temperatures (1100° C.). Further, low temperature electrical resistivity properties were found to be maintained even after a heat cycle at 1100° C. Still further, the electrical resistivity at 400° C. before and after the execution of a heat cycle was found to be relatively nominal. Noteworthy, while samples Zn3 showed an electrical resistivity increase (delta, Δ) of about $1 \times 10^{-3}$, Zn7 showed an electrical resistivity delta Δ of less than that amount, effectively a zero increase in electrical resistivity. The actual data for samples Zn3, Zn7, Zn8 plotted against comparative example, T1186, is shown in FIG. 3. T1186 corresponds to a commercially available, state-of-the-art tin oxide-based electrode having a nominal composition of 0.5 wt. % CuO, 0.9-1.0 wt. % $Sb_2O_3$, and a balance of $SnO_2$.

Further, the working examples demonstrated superior corrosion resistance as compared to a baseline standard (100) associated with T1186. The dynamic corrosion test procedure was carried out to determine the glass corrosion resistance by subjecting the samples to molten glass. In the test procedure, the samples were rotated within a crucible of molten glass, to simulate the dynamic conditions of service in a furnace. Reduction of corrosion caused by dissolved refractory saturating the glass can be minimized by changing the glass during the test in the case of long-duration experiments. The samples were evaluated by measuring the volume difference before and after the test. Two measurements were obtained, including total corrosion, the volatilization/shrinkage of the samples above the glass line, and submerged corrosion, the corrosion below the glass line. The corrosion index was calculated by relative volume loss (Δ V-V) of the reference sample (T1186)/relative volume loss of the sample, times 100. The reference sample has an index of 100, and a corrosion resistance of a sample higher than the index of 100 will accordingly have a higher index than the reference sample. In the particular cases of Zn3 and Zn7, the corrosion indexes were found to be 106 and 107, respectively, representing superior corrosion resistance.

While embodiments of the invention have been illustrated and described as tin oxide-based electrodes and structures incorporating same, the invention is not intended to be limited to the details shown, since various modifications and substitutions can be made without departing in any way from the scope of the present invention. For example, additional or equivalent substituents can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A tin oxide-based electrode formed from a composition comprising:
   a major component comprised of $SnO_2$; and
   additives comprising a=CuO, b=ZnO, and c=$Sb_2O_3$, wherein:
   a, b, and c represent weight percentages of respective components CuO, ZnO, and $Sb_2O_3$;
   b<0.7; and
   the electrode has a bulk density not less than 6.70 g/cm³.

2. The electrode of claim 1, wherein (a+b)/c<0.7.
3. The electrode of claim 1, wherein (a+b)/c<0.3.
4. The electrode of claim 1, wherein 0.05<a/b<0.7.
5. The electrode of claim 1, wherein a/b<0.5.
6. The electrode of claim 1, wherein a>0.025 wt % of the composition.
7. A tin oxide-based electrode formed from a composition comprising:
   a major component comprised of $SnO_2$; and
   additives comprising a=CuO, b=ZnO, and c=$Sb_2O_3$, wherein:
   additives comprising a=CuO, b=ZnO, and c=$Sb_2O_3$, wherein:
   a, b, and c represent weight percentages of respective components CuO, ZnO, and $Sb_2O_3$;
   b ≦0.7; and
   the electrode has a bulk density not less than 6.70 g/cm³, wherein the electrode has an electrical resistivity of not greater than about 0.1 ohm-cm at 100° C., wherein the electrical resistivity of not greater than about 0.1 ohm-cm at 100° C. is measured in an as-formed state, without annealing.
8. The tin oxide-based electrode of claim 1, wherein 0.2< (a+b)/c<0.8.
9. A tin oxide-based electrode formed from a composition comprising:
   a major component comprised of $SnO_2$; and
   additives comprising a=CuO, b=ZnO, and c=$Sb_2O_3$, wherein:
   a, b, and c represent weight percentages of respective components CuO, ZnO, and $Sb_2O_3$, and (a=b)/c<0.7; a<0.15; and
   the electrode has an electrical resistivity of not greater than about 0.1 ohm-cm at 100° C., wherein the electrical resistivity of not greater than 0.1 ohm-cm at 100° C. is measured in an as-formed state, without annealing.
10. The electrode of claim 9, wherein 0.4<b<0.6.
11. The electrode of claim 9, wherein 0.50<c<1.5 wt %.
12. The electrode of claim 9, wherein 0.75<c<1.25 wt %.
13. The electrode of claim 9, wherein the electrode consists essentially of $SnO_2$, CuO, ZnO, and $Sb_2O_3$.
14. The electrode of claim 9, wherein the $SnO_2$ forms not less than 95wt % of the composition.
15. The electrode of claim 9, wherein a <0.08.
16. The electrode of claim 9, wherein the $SnO_2$ is provided in the composition in the form of a virgin $SnO_2$ powder.
17. The electrode of claim 9, wherein the $SnO_2$ is provided in the composition in the form of a virgin $SnO_2$ powder combined with calcined $SnO_2$ powder.
18. The electrode of claim 17, wherein the calcined $SnO_2$ powder contains minor amounts of other oxides.
19. The electrode of claim 9, wherein the electrode has a bulk density not less than 6.70 g/cm³.
20. A tin oxide-based electrode formed from a composition comprising:
   a major component comprised of $SnO_2$; and
   additives comprising CuO, ZnO, and $Sb_2O_3$, wherein the electrode has an electrical resistivity of not greater than 0.1 ohm-cm at 100° C.
21. The electrode of claim 20, wherein the electrode has an open porosity not greater than about 0.7%.
22. The electrode of claim 20, wherein the electrical resistivity of not greater than 0.1 ohm-cm at 100° C. is measured in an as-formed state, without annealing.

23. The electrode of claim 20, wherein the electrode has a maximum volume resistivity increase of $1\times10^{-1}$ ohm-cm at 400° C. after exposure to a heating cycle.

24. The electrode of claim 23, wherein the electrode has a maximum volume resistivity increase of $1\times10^{-2}$ ohm-cm.

25. The electrode of claim 23, wherein the electrode has a maximum volume resistivity increase of $1\times10^{-3}$ at 400° C. after exposure to the heating cycle.

* * * * *

UNITED STATES PATENT AND TRADEMARK OFFICE
CERTIFICATE OF CORRECTION

PATENT NO. : 7,685,843 B2  Page 1 of 1
APPLICATION NO. : 10/898146
DATED : March 30, 2010
INVENTOR(S) : Olivier Citti et al.

It is certified that error appears in the above-identified patent and that said Letters Patent is hereby corrected as shown below:

In the Claims:

Column 5, Line 66, please change "$b < 0.7$" to -- $b \leq 0.7$ --

Column 6, Line 2, please change "$c < 0.3$" to -- $c \geq 0.3$ --

Column 6, Line 5, please change "$a > 0.025$" to -- $a \geq 0.025$ --

Column 6, Line 24, please change "$0.2 < (a+b)/c < 0.8$" to -- $0.2 \leq (a+b)/c \leq 0.8$ --

Column 6, Line 32, please change "$(a=b)/c < 0.7$" to -- $(a+b)/c \leq 0.7$ --

Column 6, Line 33, please change "$a < 0.15$" to -- $a \leq 0.15$ --

Column 6, Line 39, please change "$0.4 < b < 0.6$" to -- $0.4 \leq b \leq 0.6$ --

Column 6, Line 40, please change "$0.50 < c < 1.5$" to -- $0.50 \leq c \leq 1.5$ --

Column 6, Line 41, please change "$0.75 < c < 1.25$" to -- $0.75 \leq c \leq 1.25$ --

Column 6, Line 46, please change "$a < 0.08$" to -- $a \leq 0.08$ --

Signed and Sealed this
Tenth Day of December, 2013

Margaret A. Focarino
*Commissioner for Patents of the United States Patent and Trademark Office*